Nov. 12, 1957 — S. MILLAR — 2,812,742
MILKING MACHINES
Filed July 27, 1955 — 5 Sheets-Sheet 3
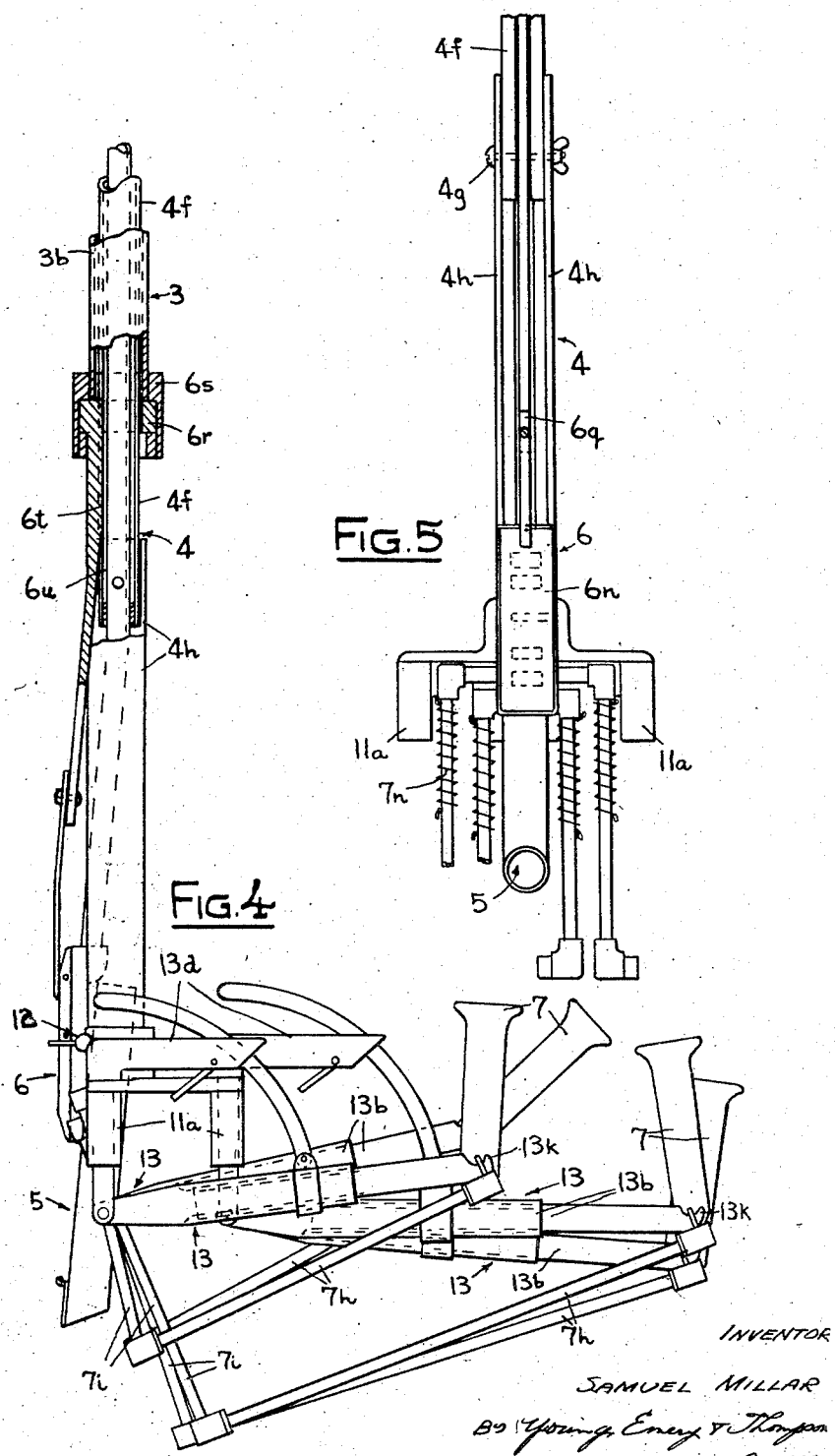

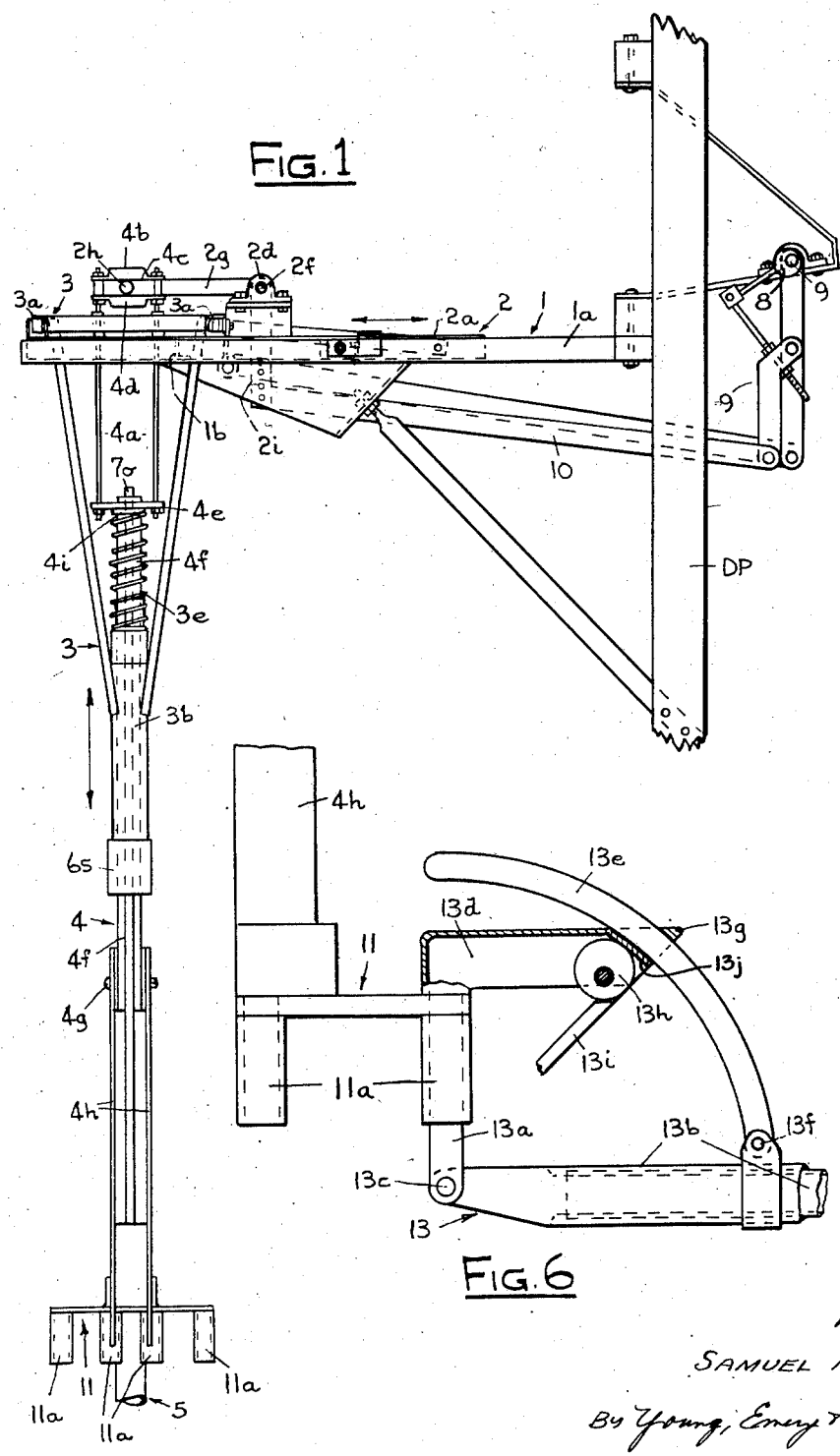

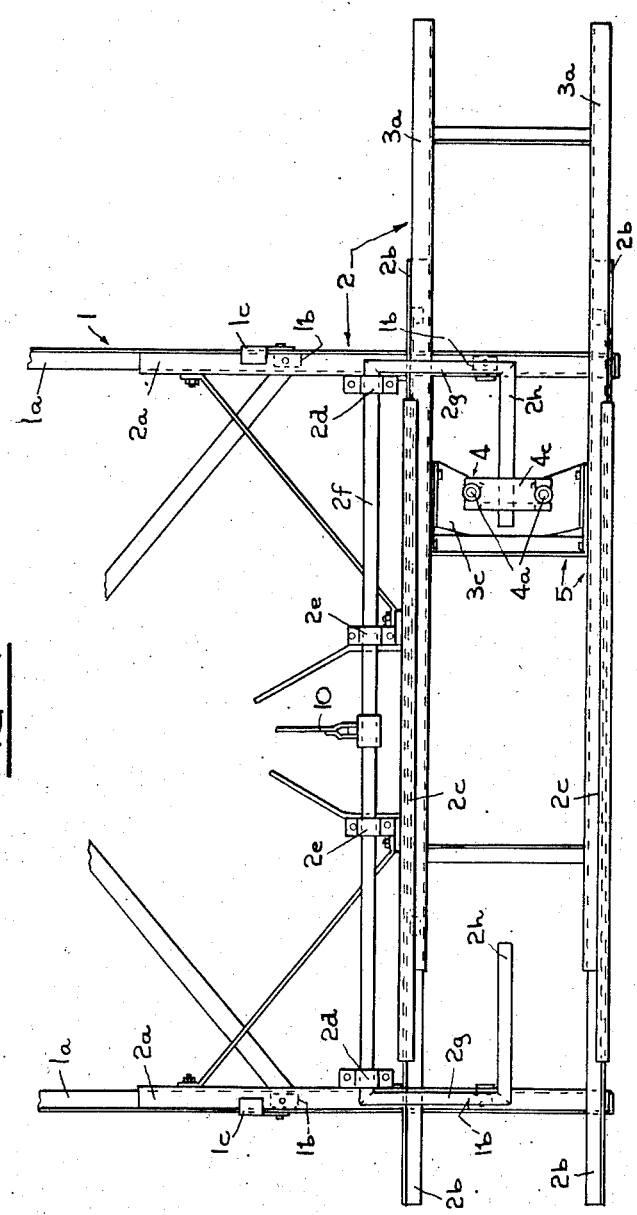
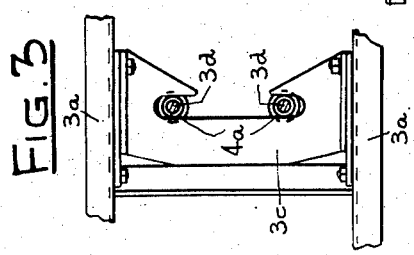

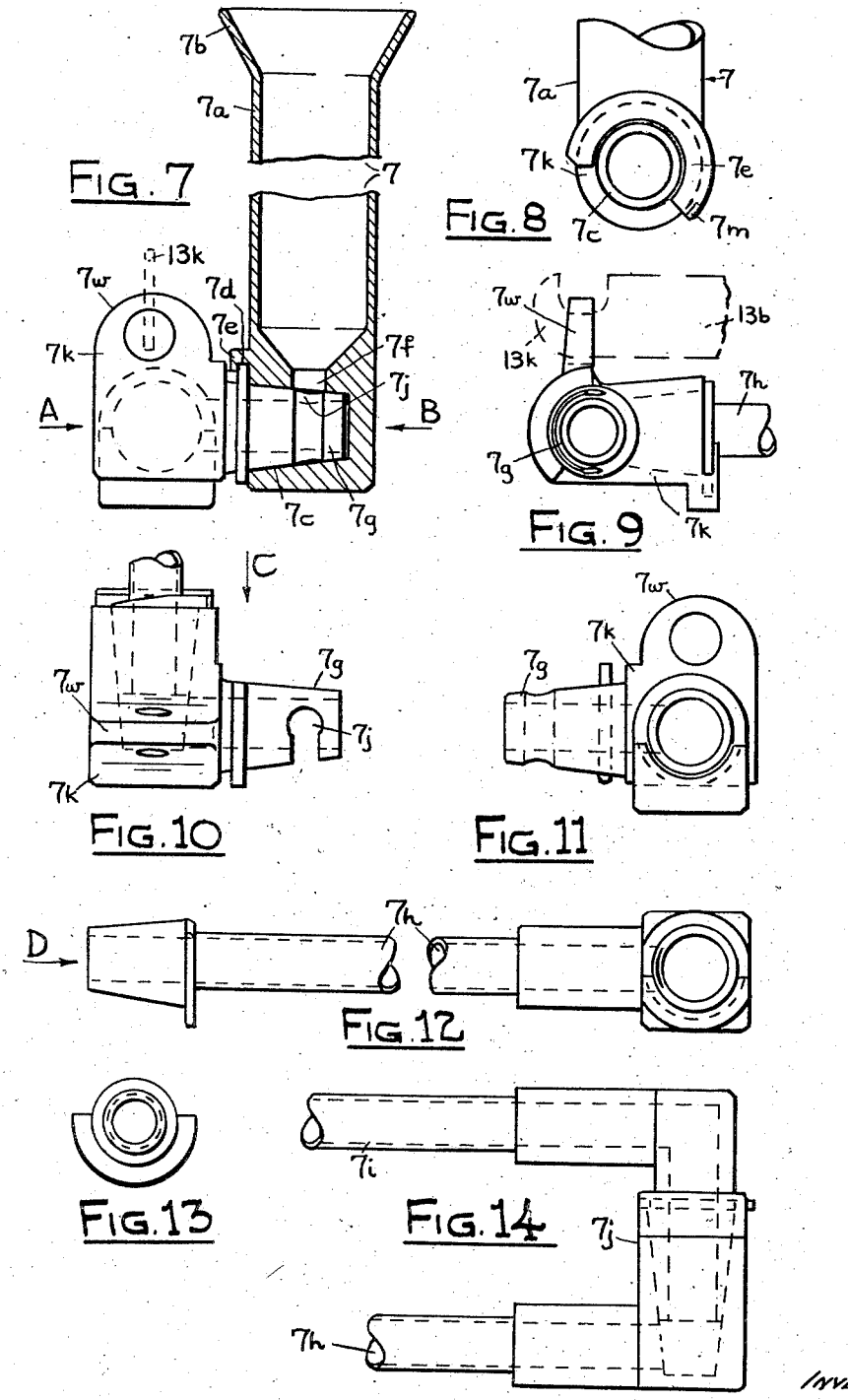

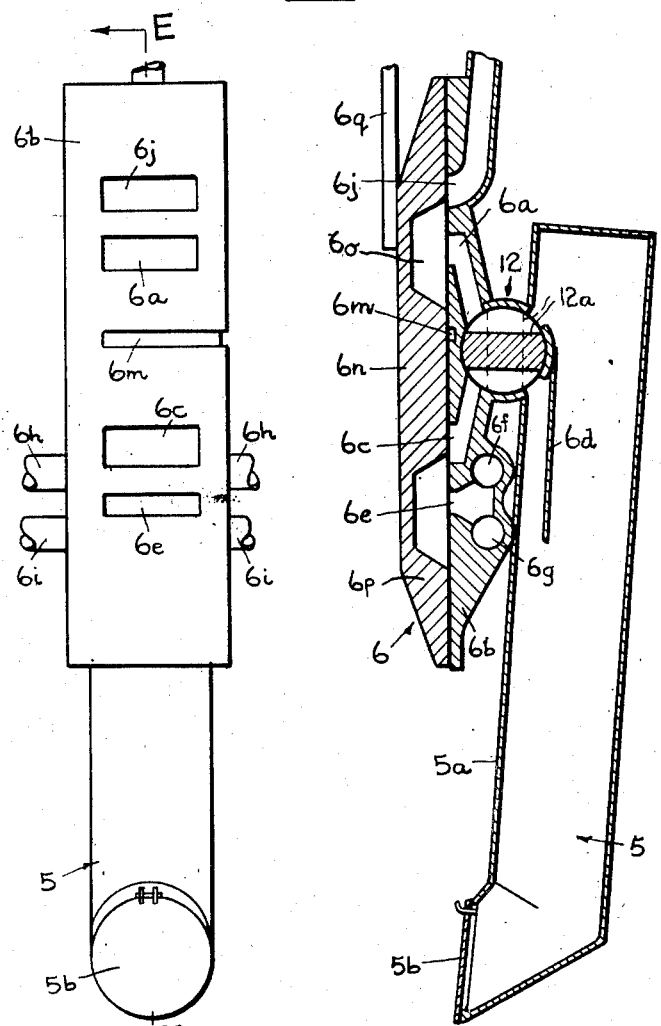

United States Patent Office 2,812,742
Patented Nov. 12, 1957

2,812,742

MILKING MACHINES

Samuel Millar, Ashburton, New Zealand

Application July 27, 1955, Serial No. 524,703

6 Claims. (Cl. 119—14.1)

This invention has reference to improvements in and relating to milking machines.

Present day milking machines include certain rubber parts which are generally unsanitary after certain use and continual replacement thereof is an uneconomical upkeep.

The purpose of the invention is to provide a machine in which all parts coming in contact with the milk are made from stainless metal, thus eliminating the inclusion of any rubber parts, which from a hygienic point of view is very favourable. These metal parts are so made that they can be taken apart and reassembled easily and quickly without the aid of any tool, also the parts are of a size whereby they can be placed in a container and set over a steam jet or in boiling water for sterilization. The assembly constitutes a single line machine which works smoothly, efficiently and silently, and milks quickly and strips without the usual assistance.

One of the objects of the invention is to provide a novel mechanically operated suspender means to support teat cups and give the correct number of up and down movements per minute and the right length of movement, which movement also can operate a slide valve on a stall releaser to give pulsations. This suspending means is also capable of back and forward movement and also to be moved from one side of a double stall to the other.

Another object of the invention is to provide a novel form of teat cups that are prevented from falling and coming into contact with the floor of the shed, or creeping upwards on the cow's teats, but are a unitary piece and automatically pressed downwards against suction to aid in clean stripping of the cow.

A still further object of the invention is to provide a novel form of milk conveyance parts and fittings from the teat cups to the releaser.

With these main objects in view and others as will be apparent in the later appended description, generally stated, the invention consists of the novel features and combination thereof.

One preferred form of the invention will now be described with reference to the accompanying drawings, in which:

Figure 1 is a part side elevation of the same, some parts being omitted.

Figure 2 is a plan of the same, some parts being omitted.

Figure 3 is a plan of the means for guiding the suspender.

Figure 4 is a side elevation, partly in section, on a larger scale, of the lower part of the suspender, showing the teat cups, cup holders, lower milk tubes, stall releaser, pulsator, and the lower end of the suspender frame.

Figure 5 is a rear elevation of the lower part of the suspender, showing the stall releaser, pulsator, and some of the milk tubes.

Figure 6 is a side elevation, partly sectioned, showing the method of adjusting the cup holders.

Figure 7 is an axial median section through one of the cups, an associated elbow being shown in elevation.

Figure 8 is a side elevation of the lower part of the cup, in the direction of the arrow "A," Figure 7, showing the elbow socket.

Figure 9 is a side elevation of the elbow, in the direction of the arrow "B," Figure 7, showing the outer end of one of the holders.

Figure 10 is a plan of the elbow shown in Figure 7.

Figure 11 is a side elevation of the elbow, in the direction of the arrow "C," Figure 10.

Figure 12 is a side elevation of the milk tube nearest to one of the cups.

Figure 13 is an end elevation thereof, in the direction of the arrow "D," Figure 12.

Figure 14 is a plan of the elbow joint between the two milk tubes associated with one of the cups.

Figure 15 is an axial median section through one part of an elbow joint having a plug for access to the interior of the milk tube.

Figure 16 is an elevation of the stall releaser and pulsator base.

Figure 17 is a vertical axial section through the stall releaser and pulsator, on the line E—E, Figure 16.

In the construction shown in the drawings, a base frame 1 is fixed suitably to stall framework which includes pillars (only one DP is illustrated) and a main frame 2 comprising overhead guide means is movably mounted on the base frame 1 to be adjustable backwards and forwards in relation to the stall's dummy pillars. The main frame 2 supports a suspender frame 3 which in turn vertically reciprocates and guides and partially supports a suspender 4. This suspender carries an auxiliary stall type milk releaser 5 with an associated pulsator 6 and a set 7 of teat cups at its lower end. The suspender frame 3 is movable in relation to its supporting main frame 2 in order to enable the suspender 4 to be moved from near one stall to near an opposite one.

Milk from the teat cups can be taken at choice to the stall releaser 5 or through telescopic jointed rigid tubing and plug and socket jointed rigid tubing associated with the teat cups and the suspender shortly described to a main milk line discharging through a suitable releaser which may be located in an adjoining room and supplied from several units.

Referring in greater detail to the construction of the machine, the base frame 1 in the construction shown comprises suitably braced outwardly extending parallel and substantially horizontal angles or tracks 1a disposed for example at a height of about six feet above the floor of the milking shed, and rollers carried thereon support the main frame 2, roller stops 1b being provided to limit movement of the rollers, and keepers 1c being provided to maintain the main frame in association with the base frame.

The main frame 2 comprises parallel rails 2a running on the rollers above referred to, the rails 2a being suitably connected together and braced, and having cross tracks 2b extending across and beyond the rails 2a, with rollers running thereon to support the suspender frame 3. Keepers 2c are provided to maintain the suspender frame in association with the said main frame.

The main frame 2 also carries bearings 2d and 2e which pivotally support a cross-shaft 2f which is connected at each end at 2g by a crank part to a long crank-pin part 2h which arises and falls about the axis of the cross shaft with pivotal movement of the latter. The said pivotal movement is applied thereto from a suitable drive shaft 8 extending across the back of the dummy pillars (DP) and driving a crank 9 and link 10 pivotally connected to dependent lever 2i on the cross-shaft 2f, there being a compensating mechanism associated therewith to allow for the back and forward movement of the main frame. The shaft 2f with its ends 2q, the lever 2i, the shaft 8, the crank 9 and the link 10 form part of a vertically reciprocating means associated with the suspender 4.

The suspender frame 3 comprises two connected parallel rails 3a which run on the rollers above referred to, and a centrally disposed dependent socket 3b for the suspender 4 to pass therethrough. It has also, centrally over the socket, a guide plate 3c and associated guides 3d for vertical actuating rods 4a of the suspender 4.

The rollers between the base frame 1 and main frame 2, and between the main frame 2 and suspender frame 3, facilitate movement of the suspender frame backwards and forwards and from one side stall to the other.

The vertically reciprocating means associated with the suspender 4 also include one or other of the crank pin parts 2h, according to which side stall the suspender is located, the appropriate crank-pin part engaging between upper and lower plates 4c and 4d of a clutch or slotted assembly 4b fixed to the upper ends of the vertical actuating rods 4a of the suspender.

The lower ends of the said rods 4a are fixed to a crosshead 4e which is swivelled at 4i on the upper end of a vertical suspender main tube 4f passing downwards through the suspender frame socket 3b and detachably connected in turn below the latter at 4g, to the upper ends of two dependent side members 4h carrying at their lower ends a cluster 11 of cup-holder mounting sockets 11a. The swivel 4i enables the cluster 11 to be swung from one bail stall to another, or in any other direction about its vertical pivot.

The side members 4h also mount, at their lower ends, the stall releaser 5 and pulsator 6.

The stall releaser 5 comprises a nearly vertical tubular vessel 5a having at its lower end a flap valve 5b adapted to discharge into a bucket or other receptacle when the said stall releaser is in use, milk being discharged into the upper part of the stall releaser through a manually controlled valve 12 the plug 12a of which can be disposed as shown in full lines in Figure 17 when the stall releaser is in use, and as shown in dotted lines when a main releaser is preferred.

In the position of the valve plug 12a shown in full lines, vacuum and atmospheric air applied alternately through the port 6a of the pulsator base 6b to the top of the stall releaser 5 and milk from the milk port 6c of the pulsator base 6b enters the upper part of the said stall releaser at a lower level than the point of application of vacuum and atmospheric air thereto, and behind a baffle 6d.

The pulsator base 6b also has a further port 6e communicating with two transverse milk passages 6f and 6g communicating with projecting tubular projections 6h and 6i which receive milk individually from the four teat cups, and an upper port 6j connected to a main milk line which constitutes the source of vacuum.

Across the face of the pulsator base, between the ports 6a and 6c there is provided an atmospheric air intake port 6m which communicates with the atmosphere through the side of the base 6b.

A slide 6n of the pulsator has upper and lower transfer ports 6o and 6p respectively, the upper port 6o being adapted to provide communication between the port 6a on the one hand and alternate ports 6j and 6m on the other hand, to pulsate the stall releaser 5, while the lower port 6p is adapted to intermittently provide communication between the ports 6c and 6e in order to intermittently apply vacuum to the cow's teats.

In the position of the valve plug 12a shown in dotted lines, the stall releaser 5 is cut off and vacuum is applied intermittently to the teat cups through the uppermost port 6j, port 6a, port 6c and port 6e, milk being taken from the teat cups through the cluster 11 and milk tubes to the main releaser.

In order to operate the pulsator, the slide 6n is held stationary by means of an extensible rod 6q which is removably associated with the pulsator slide and is fixed eccentrically at its upper end to a ring 6r rotatable within a groove in a built-up collar 6s fixed to the lower end of the socket 3b. Consequently vertical oscillations of the suspender result in the pulsator base 6b oscillating against the slide 6n. A tongue 6t on the rod 6q engages in a longitudinal slot 6u in the suspender main tube 4f so that the rod will rotate with the main tube in swivelling from stall to stall.

The teat cups 7 are supported by holders 13 comprising stems 13a passing vertically through the cup holder sockets 11a and pivotal therein, with slidably extensible arms 13b pivoted at 14c to the lower ends of the stems 13a and locking arms 13d projecting horizontally and on the same side of the stems and releasably and adjustably locking at their outer ends with curved arms 13e projecting upwards from pivots 13f on the arms 13b, so as to adjust the vertical positioning of the cups 7 carried at the forward ends of the arms 13b.

The locking arms 13d are closed at 13g at their outer ends, and a cam 13h actuated by a finger plate 13i acts through a flexible plate 13j to jam the curved arms 13e against the closures 13g.

The teat-cups 7 comprise stainless metal tubes 7a about one inch in diameter and for example about six inches in length having flanges 7b on the mouth end, and a side socket 7c at the lower outlet end, with a semi-circular groove 7d and locking lip 7e outside and disposed partway around the socket, in order to retain the cup in association with an elbow 7k on a milk tube 7h to be hereinafter referred to throughout a substantial arc of pivotal movement.

The cups are not designed to house inflators. The interior of each cup 7 communicates with the interior of the socket through a small port 7f which by virtue of its coaction with a port 7j in the plug 7g on the elbow 7k provides communication with the milk tube through only a part of the pivotal movement of the cup, there being communication when the cups are turned upwards in their normal working position and also when they are turned down, such as when drawing water from a bucket. When turned to a horizontal position, in which position they may be supported by a stop 7m engaging a part of the elbow, they may be cut off from vacuum, and this is of use when milking cows with less than the usual four effective teats.

The milk tubes between the cups 7 and the tubular projections 6h and 6i on the pulsator are in two sections 7h and 7i, with a plug and socket joint 7j between the two sections, the said plug and socket joint being similar to the joint at the base of the teat cup but without provision for cutting off communication between the two sections when the joint is pivoted beyond a predetermined angle. The joint between the section 7i and the projection 6h or 6i, as the case may be, may be similar, the tubular projection forming a plug and there being a similar locking means. Preferably, the discharge end of the tube section 7i is removablly telescoped into a socket on the projection, and a spring 7n is used to hold the milk tube section to the socket.

The milk line from the pulsator 6 passes upwards through the suspender 4 in telescoping sections, and from the point 7o above the socket 3b, plug and socket jointed tubes convey the milk to the milk line leading to the main releaser.

Figure 15 shows a form of milk tube plug and socket joint having removable closures 7t which can be locked in place by means of a lip 7u and flange 7v and which when removed facilitate cleaning of the tube sections.

The main releaser is of any convenient type and is appropriately operated to release the milk into a vat or any other desired receptacle.

The outer end of each cup holder arm 13b has a hook 13k engaging in a loop 7w formed on the upper side of the plug 7g associated with the milk tube 1h.

Part of the weight of the suspender and associated parts is taken by the suspender socket 4b through the medium of a compression spring 4e located between the swivel 4i and the top of the socket.

The milk tubes, cups and all other parts in contact with the milk are preferably made of stainless steel. The milk tubes and cup supports used with cups for the far-side teats are longer than those for the near side teats, to provide for the longer reach, and it will be noted that two of the holder sockets 11a are nearer the cow than the other two, in order to provide for the longer reach to the far side of the cow's udder. The longer milk tubes 7h from the cups may for example be about 20 inches long, and the shorter ones may be about 12 inches in length.

The plug and socket joints, and the telescopic joints, between the various milk tubes, are designed and fitted in such a manner as to allow for the upward and downward movement of the suspender 4 and for its linear movement from one stall to another and for its backward and forward movement relatively to the main milk line, and for the swivelling movement thereof.

All of the parts coming into contact with the milk are arranged and fitted so that they can be easily dismantled and reassembled without the aid of tools. Preferably none of these parts exceeds the length of a cream can, so that they can be conveniently placed in tubs as used for washing cans.

Preferably, all of the plug and socket joints are so made and fitted, as shown, in the drawings, with reference to such of the plug and socket joints as are shown in detail therein, that they can be connected and disconnected by holding them in a non-working position, so that when turned to a working position they cannot come apart. The tubes, except for the main milk line, may be ½ inch and ⅝ inch tubing.

The plug socket joints between the cups and the pulsator enable the heights of the cups to be adjusted independently of each other, and they allow the cups to be held at any desired angle on the teats.

In operation, the milking vacuum is generated in any suitable way and the suspender 4 is vertically controlled as above described. The cup-holder locking means are released and the cups are placed on the cow's teats and re-locked at the necessary level, the suspender having already been brought into the correct position, with the appropriate crank-pin member engaging the clutch or slotted assembly 4b at the upper end of the suspender. If necessary the valve 12 is adjusted, according to whether it is desired to release the cow's milk separately in the stall or with milk from other stalls into a common releaser in the milk room.

The up and down movement of the suspender 4 is transmitted to the cups mechanically, due to the locking of the cups to the suspender, which results in efficient milking and clean stripping of the cows, due to the cups being pressed downwards against the suction. The mechanical holding of the cups also prevent them from creeping upwards on the teats, and prevents them from falling and coming into contact with the floor of the shed.

For the above reason, and also because of the absence of rubbers, the machine is very much superior to those being used at present, from the hygienic point of view. The absence of rubbers also reduces upkeep.

The up and down movement of the suspender 4 also operates the pulsator 6 which alternately connects and cuts off the vacuum from the teat cups 7, and cuts off and admits air to the releaser 5. The pulsator operates the valve alternately so that when the suspender is at the upper part of its travel vacuum is cut off from, and air is admitted, to the stall releaser, the vacuum being reconnected as the suspender begins its downward movement and remains connected while such suspender is downward against suction.

As will be seen the machine is a pipe line milking system, and accordingly has few parts requiring cleaning, and owing to its construction it works smoothly, efficiently and comparatively silently. The adjusting movements of the suspender backwards and forwards and sideways do not interfere with the mechanical vertical operation of the suspender and pulsator.

Having now described my invention, what I claim is:

1. A milking machine comprising a base frame for fixing to a stall, a main frame movably mounted to the base frame on rollers, a suspender frame movably mounted to the main frame on rollers, a suspender passing through a dependent socket of the suspender frame, vertically reciprocating means attached to an upper end of the suspender, holders having stems pivotally mounted in sockets carried at a lower end of the suspender, teat cups supported by the holders, and milk tubes connected with the teat cups.

2. A milking machine of the class described comprising a suspender, overhead guide means mounting the suspender in a dependent socket, a cross-shaft pivotally supported in bearings in the overhead guide means the shaft having crank parts connected to an upper end of the suspender, vertically reciprocating means pivotally connected to the cross-shaft by a lever, holders having stems pivotally mounted in sockets carried at a lower end of the suspender, teat cups supported by the holders and milk tubes connected with the teat cups.

3. A milking machine of the class described comprising a base frame for fixing to a stall having pillars, a main frame movably mounted by rollers to the base frame to be adjustable backwards or forwards relative to the pillars, a suspender frame movably mounted on rollers to the base frame to be adjustable from one stall to another, a suspender socket depending centrally from the suspender frame, a suspender passing through the socket, a cross-head on an upper end of the suspender, a compression spring located between the cross-head and the top of the suspender socket, actuating rods extending from the cross-head, an assembly fitted upon the rods, a cross-shaft pivotally supported in bearings in the main frame the shaft having crank parts which may rise and fall about the longitudinal axis of the cross-shaft in pivotal movement of the latter, vertically reciprocating means pivotally connected to the cross-shaft by a lever, compensating mechanism associated with such means to allow for adjustment of the main frame, upper and lower plates of the said assembly engaging a crank part for reciprocating the suspender, a cluster of cup-holder sockets carried on the lower end of the suspender, holders having stems pivoted in the sockets, slidably extensible arms pivoted in lower ends of the holder stems, locking arms projecting from the stems, teat cups adjustably carried at forward ends of the arms, curved arms releasably and adjustably locking with the outer ends of the stems which curved arms project upward from pivots on the locking arms for adjustment of vertical positioning of the teat cups, milk tubes connected with the teat cups and the holders and a milk tube extending inside the suspender connected with the holders, for connection to a main milking line.

4. A milking machine of the class described comprising a suspender, overhead guide means partially supporting the suspender in a dependent socket, holders having stems pivotally mounted in sockets carried at a lower end of the suspender, teat cups supported by the holders, a pulsator partially mounted on the suspender and the guide means, vertically reciprocating means attached to an upper end of the suspender for vertically reciprocating the latter and the part of the pulsator in milking actions, milk tubes connected with the teat cups and a milk tube connected with milk tubes extending through the suspender for connection with a main milking line.

5. A milking machine of the class described comprising a suspender, overhead guide means partially supporting the suspender in a dependent socket so the suspender may be turned axially, holders having stems mounted in sockets carried at a lower end of the suspender so the holders may be turned horizontally, teat cups supported by the holders, an auxiliary stall type releaser carried at the lower end of the suspender, a pulsator partially mounted on the releaser and the associated guide means, vertically reciprocating means attached with an upper end of the suspender for reciprocating the latter and the part of the pulsator in milking actions and milk tubes adjustably and detachably connected through flexible jointing from the teat cups to the releaser, a number of the tubes having a longer length to the teat cups for longer reach relative to the length for the remaining teat cups, and milk tubes telescopically jointed passing through the suspender from the releaser for connection to a main milking line.

6. A milking machine of the class described comprising a base frame fixed to a stall, a main frame movably mounted to the base frame on rollers to be adjustable backwards or forwards relative to the stall, a suspender frame movably mounted to the main frame on rollers, to be adjustable from one stall to another relative to the stall, a suspender guided and partially supported in a dependent socket of the suspender frame, vertically reciprocating means attached to an upper end of the suspender, an auxiliary stall type releaser and an associated pulsator carried at a lower end of the suspender, holders having stems mounted in sockets carried at the lower end of the suspender so that they may be turned in a horizontal plane, teat cups supported by the holders and rigid milk tubes composed of lengths adjustably and detachably connected through telescopic joints and plug and socket joints, from teat cups and through the suspender.

References Cited in the file of this patent

UNITED STATES PATENTS

| | | |
|---|---|---|
| 347,558 | Beyer et al. | Aug. 17, 1886 |
| 1,536,634 | Shippert et al. | May 5, 1925 |
| 2,714,893 | Zimmer | Aug. 9, 1955 |